March 22, 1960     E. R. FAIRBANKS     2,929,535
DISPENSER FOR BEVERAGES
Filed Oct. 8, 1957     4 Sheets-Sheet 1
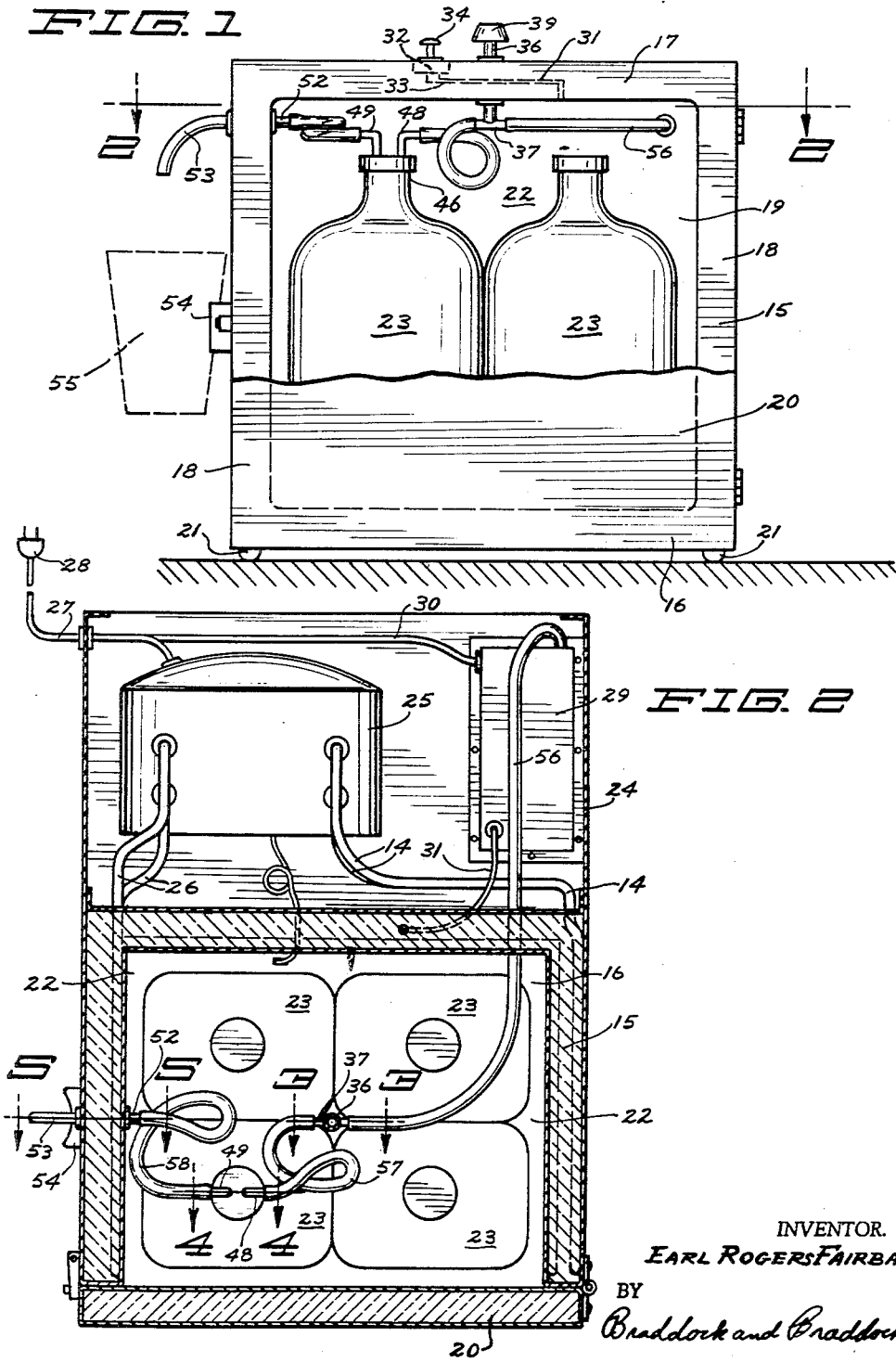
INVENTOR.
EARL ROGERS FAIRBANKS
BY
Braddock and Braddock
ATTORNEYS

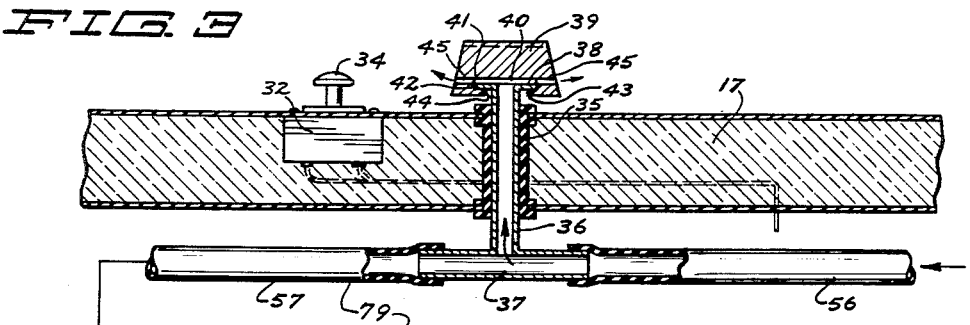
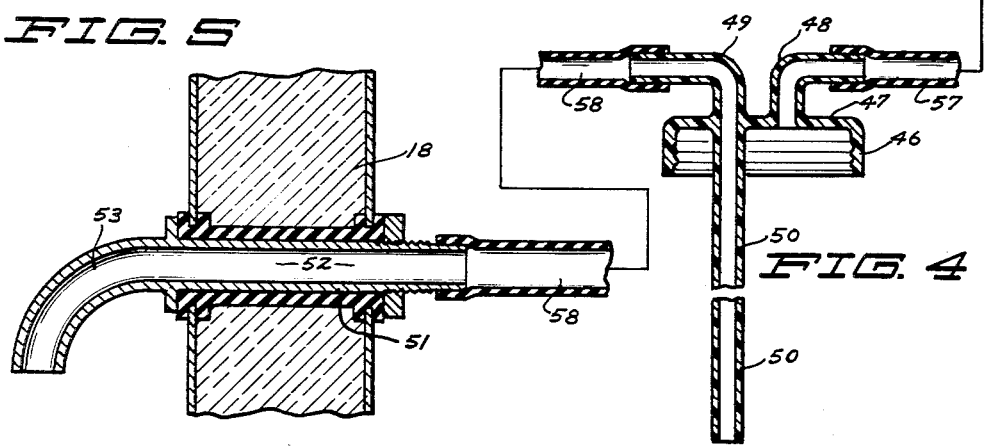
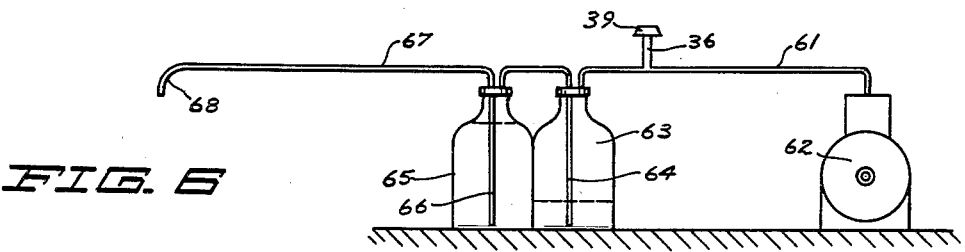
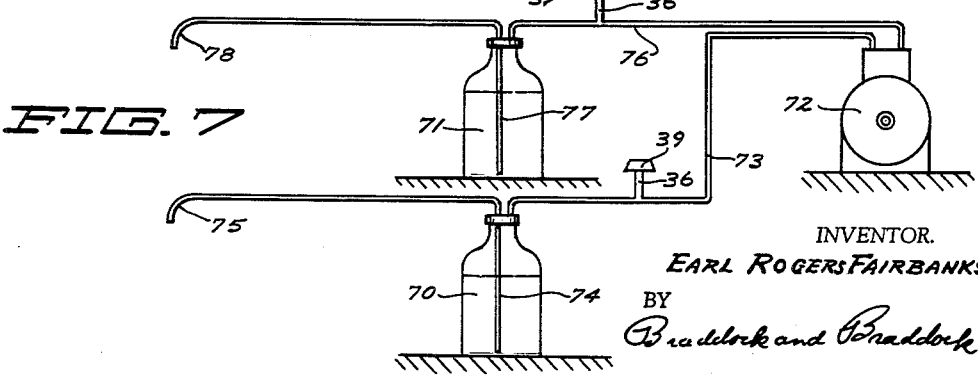

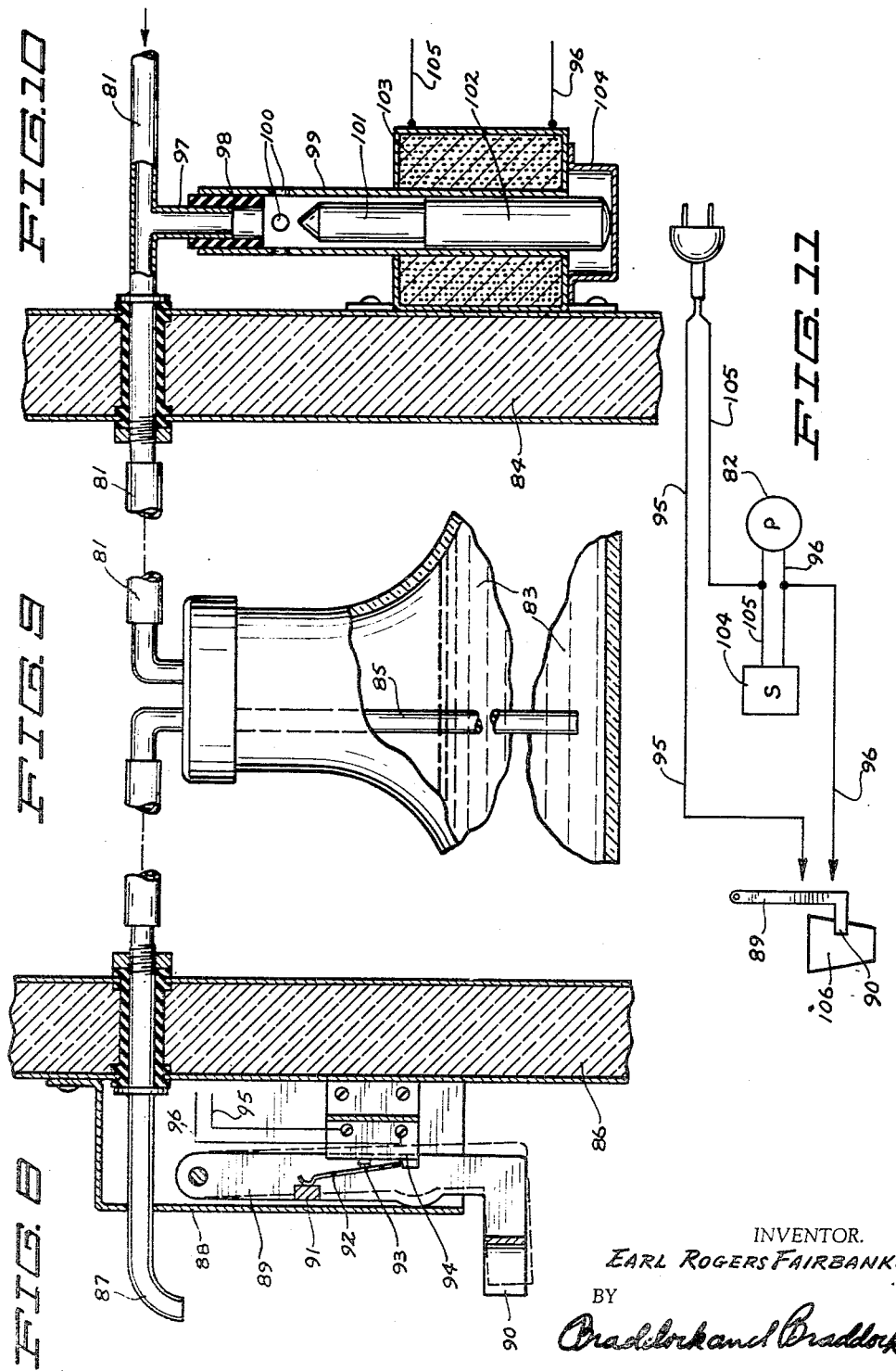

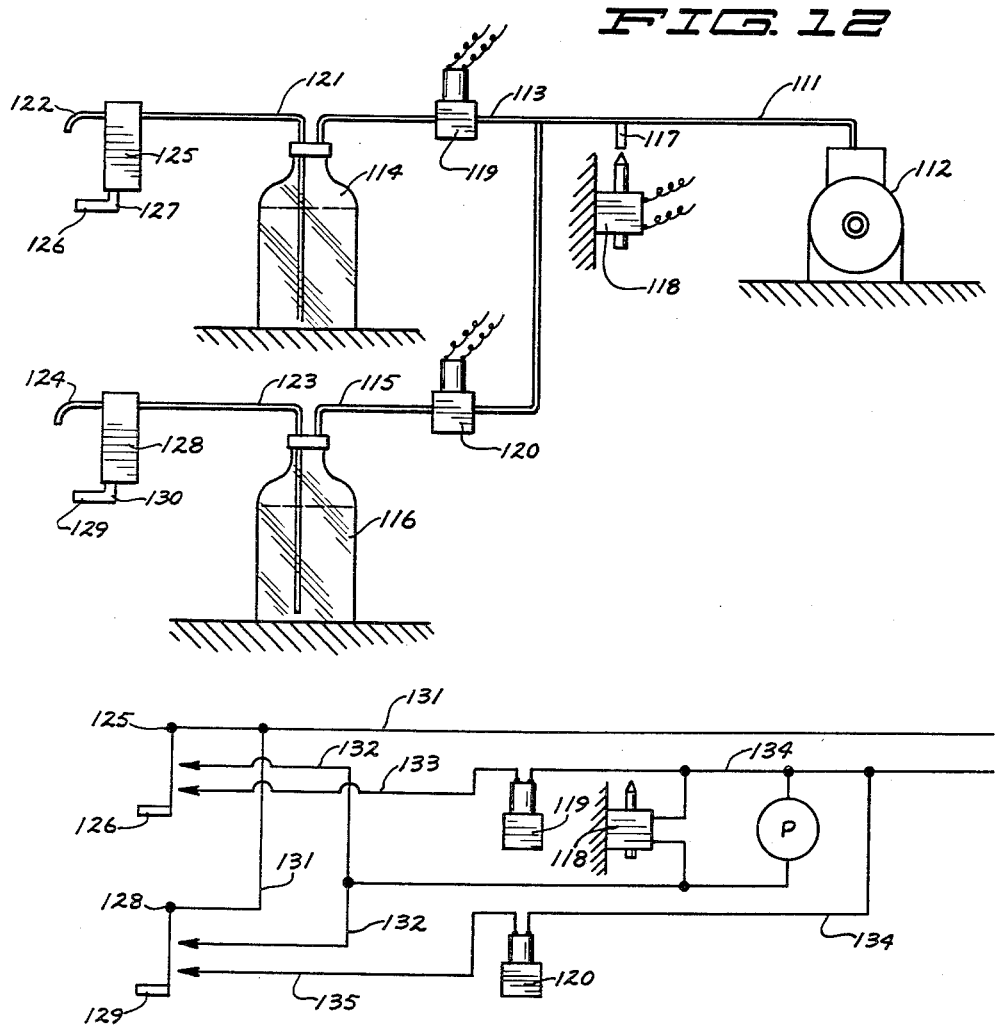

United States Patent Office 2,929,535
Patented Mar. 22, 1960

2,929,535

DISPENSER FOR BEVERAGES

Earl R. Fairbanks, Hudson, Wis., assignor to United Refrigerator Company, Hudson, Wis., a corporation of Minnesota Application October 8, 1957, Serial No. 688,894

5 Claims. (Cl. 222—76)

This invention has relation to a dispenser for liquids and more particularly to a refrigerated dispenser for beverages such as milk, water, fruit juices, etc.

In a device made according to the invention, an air tight container for beverages or other liquids is situated inside of a liquid storage cabinet. An air inlet tube opens into the top of the container, and a liquid outlet tube is open to a bottom portion thereof. The air inlet tube is connected to the outlet of an air pump and the liquid outlet tube terminates in a dispensing spout. A normally open air pressure relief valve is situated in the air inlet tube between the container and the pump. When it is desired that liquid be dispensed from the dispenser, the pump is actuated to introduce air under pressure into the air inlet tube, and the air relief valve is maintained in closed position. Pressure of air in the container forces liquid out of the liquid outlet tube and through the dispensing spout. When sufficient liquid has been dispensed, the air relief valve is opened and the motor of the air pump is deenergized. Air pressure in the air inlet line will immediately be dropped to atmospheric, and this will result in an immediate cessation of flow of liquid to the liquid outlet line and through the dispensing spout.

In the drawings,

Fig. 1 is a front elevational view, partially broken away, of a cooling unit made according to a first form of the present invention;

Fig. 2 is a horizontal sectional view taken on the line 2—2 in Fig. 1;

Fig. 3 is an enlarged sectional view taken on the line 3—3 in Fig. 2;

Fig. 4 is an enlarged sectional view taken on the line 4—4 in Fig. 2;

Fig. 5 is an enlarged sectional view taken on the line 5—5 in Fig. 2;

Fig. 6 is a diagrammatic view of a dispensing means of a second form of the invention;

Fig. 7 is a diagrammatic view of dispensing means made according to a third form of the present invention;

Fig. 8 is a fragmentary vertical sectional view of a dispensing spout and switch mounted on the insulated side wall of a dispenser made according to a fourth form of the invention;

Fig. 9 is a fragmentary side elevational view of a liquid container, closure cap and air inlet and liquid outlet tubes of the dispenser of the fourth form of the invention;

Fig. 10 is a fragmentary vertical sectional view of a normally open air relief valve, an insulated wall of the storage cabinet and a portion of the air inlet tube of said fourth form of the invention;

Fig. 11 is a schematic view of a control circuit for the fourth form of the invention as disclosed in Figs. 8, 9 and 10;

Fig. 12 is a diagrammatic view of dispensing means of a fifth form of the invention; and Fig. 13 is a schematic view of an electrical control circuit for the fifth form of the invention as disclosed in Fig. 12.

Referring to the drawings and the numerals of reference thereon and with particular attention to Figs. 1 to 5, a storage cabinet 15 of the dispenser can be of usual or preferred construction. As disclosed, the cabinet is constituted as a bottom wall 16, a top wall 17, opposite side walls, each denoted 18, a rear wall 19 and an openable and closable door 20 at the front of said cabinet. All of the walls and the door of the cabinet are insulated. Supports 21 for said cabinet extend downwardly from the lower surface of the bottom wall 16 thereof.

An interior space 22 of the cabinet 15 is for receiving containers for beverages or other liquids. As shown, four glass bottles, each indicated 23, within said cabinet are supported upon the upper surface of the lower wall 16.

A frame 24 at the rear of the cabinet suitably and conveniently supports a casing 25 housing operating elements, not shown, of customary or preferred construction, of the cooling unit. Cooling coils 26, extending from operating elements in the casing 25 and situated within the cabinet walls, are for maintaining the interior space 22 at a desired low temperature. Condenser coils 14 for dissipating the heat removed from the interior of the cabinet will likewise extend outwardly from the operating elements in the casing 25 and may be situated at any convenient location such as in an outer portion of an insulated wall 18. Electrical connections 27 to operating elements in the casing 25 lead from a plug 28 to be inserted in a socket (not shown) to be supplied with electrical energy. The manner in which the interior space 22 within the cabinet 15 is to be kept cool forms no part of the present invention. It is sufficient to say that the refrigerating system of the cooling unit will be operative to maintain the cabinet interior space constantly at a desired low temperature.

The frame 24 also suitably and conveniently supports a motor and air pump unit, indicated 29, for delivering air under pressure. An electrical connection 30 supplies power to this motor pump unit. A motor pump control lead 31 extends from said unit to an electrical switch 32 and a motor pump lead 33 extends from said switch to said unit 29.

It is to be understood that the various control elements of the dispenser could be located at any desired or suitable location with respect to the cabinet 15. The particular embodiment of the parts disclosed in the drawings is merely for the purpose of illustrating a typical installation. In the dispenser as shown, the normally open electrical switch 32 is suitably and conveniently mounted in the top wall 17 of the cabinet 15, and a push button 34 is for closing the switch to cause the motor pump 29 to become activated.

The top wall 17 of the cabinet 15 fixedly supports a vertical hollow member 35 which in turn supports a vertical hollow air relief tube 36. This relief tube 36 opens into and is integral with a horizontal hollow portion 37 of an air inlet tube 79.

An annular flange 38, above the top wall 17, is integral with and extends outwardly from the upper end of the air relief tube 36, and an air relief valve 39 is mounted upon said annular flange 38 for limited movement longitudinally of said air relief tube.

The air relief valve 39 is constituted as a block of rigid material, which may be of frusto conical shape as disclosed if desired, cut away at an intermediate part of its lower portion to provide a concavity 40 bounded at its upper end by a downwardly facing, horizontal surface 41 of said block, at its side or sides by an interiorly facing vertical cylindrical surface 42 and at its lower end by an upwardly facing, annular horizontal surface 43 in surrounding relation to an opening in the lower surface of the block bounded by an interior facing, vertical, cylindrical surface 44. Horizontal vent holes 45 extend radially outwardly through the air relief valve or block from the concavity 40 at a location where contiguous with the downwardly facing, horizontal surface 41 and the upper end of the interiorly facing, vertical, cylindrical surface 42, and in spaced relation to the upwardly facing, annular horizontal surface 43.

The opening in the lower surface of the relief valve or block, bounded by the interiorly facing surface 44, freely receives the vertical hollow air relief tube 36, and the concavity 40 freely receives the horizontal annular flange 38 of said relief tube. The construction and arrangement will be such that the relief valve or block can be depressed to cause the horizontal surface 41 thereof to come in sealing relationship to the upward end of the air relief tube; and also such that air under pressure in said air relief tube can cause said relief valve or block to be elevated or pushed upwardly when relieved of the depressing influence to establish communication between the interior of the air relief tube and the vent holes to permit the pressure inside of the air relief tube to discharge to establish atmospheric pressure therein.

As shown, glass bottles 23 are of duplicate construction. A closure member selectively to be fitted to any of said glass bottles consists of a cover cap including a downwardly extending annular flange 46 to be secured in sealing relationship on the neck of the bottle and a horizontal member constituted as a disc 47 to be engaged against the upper end of the bottle neck. A hollow elbow 48 constitutes part of the air inlet tube 79 and leads through the disc 47 to the interior of a bottle on the neck of which the closure member is fitted. A hollow elbow 49 also leads through this disc from the interior of the bottle by way of a hollow tubular element 50 having its lower end situated close to the bottom of the bottle. Elbow 49 and hollow tubular element 50 constitute a portion of a liquid outlet tube 80.

A side wall of the cabinet 15 fixedly supports a horizontal hollow member 51, and a horizontal outlet spout 52 constituted as a portion of the liquid outlet tube 80 is snugly fitted to and rigidly fixed in said horizontal hollow member 51 to extend to position both within and without said cabinet. A downwardly curved portion of the outlet spout, situated exteriorly of the cabinet, is designated at 53. Desirably, the outlet spout will be removable from the cabinet side wall in which it is mounted, in order that said outlet spout can be readily and easily cleaned. A marker 54 on the external surface of the cabinet side wall supporting the outlet spout, beneath the downwardly curved portion of the outlet spout, is for indicating the position where a receptacle, such as 55 for receiving a beverage or other liquid from the outlet spout is to be situated.

A tubular flexible connection 56 extends from the motor and pump unit 29 to an end of the horizontal hollow portion of the air inlet tube designated 37 and thereby becomes a portion of the air inlet tube 79. A flexible inlet tube 57 extends from the opposite side of the portion of the inlet tube designated 37 to the exterior end of the hollow elbow 48 and thereby becomes a portion of the air inlet tube 79. A flexible outlet tube 58 extends from the exterior end of the hollow elbow 49 to the interior end of the outlet spout 52 and thus becomes a portion of the liquid outlet tube 80.

Containers 23 within the interior space 22 of the cabinet 15 could conveniently be of waxed paper or cardboard, plastic, metal, or other suitable material and, too, the containers could be of the same or variable sizes.

When liquid is to be dispensed from a container, such as 23, the pump motor actuating switch, for example the push button 34, and the relief valve 39 of the dispensing unit will be simultaneously manually depressed to cause the air pump to operate and to seal off the air relief tube 36. Air delivered by the pump into the air inlet tube 79 will cause build up of air under pressure in the top of the bottle 23. This will force the beverage or other liquid in the bottle to flow through the hollow tubular element 50 and out through the remainder of the liquid outlet tube to discharge into a glass or other receptacle 55 for the dispensed beverage or other liquid.

When sufficient liquid has been dispensed, the push button 34 and the air relief valve 39 will be released. De-energization of the air pump motor will result in the cessation of flow of air under pressure into the air inlet tube 79. The air in the air inlet tube will, however, be under a pressure at the instant of release of the air relief valve and push button motor pump actuating switch, and this air will flow instantly through the air relief tube 36 until atmospheric pressure is again reached. As this pressure on the top of the liquid in the bottle 23 is reduced, liquid in the liquid outlet tube 80 will tend to flow back into the bottle 23 except for the portion thereof which trickles and flows by gravity out the outlet spout 52 into the receptacle 55. This flow back is assisted or caused by the siphoning action of the vertical column of liquid standing in the hollow tubular element 50 at the time the pressure inside of the top of the bottle is released. In other words, all of the liquid in the liquid outlet tube 80, except that which trickles into the receptable 55, will continue to flow back into the bottle 23 until the liquid level inside of the hollow tubular element 50 is the same as the level inside of the bottle.

The instantaneous relief of pressure in the air inlet tube 79 and the top of the bottle 23 through the air relief tube 36 upon opening of the air relief valve 39 results, as explained above, in the immediate cessation of flow from the outlet spout 52. If this quick pressure release means were not provided, the air pressure inside of the air inlet tube would not be relieved, and the liquid outlet tube would not be evacuated. In this situation, liquid would continue to drip from the outlet spout 52 after the receptacle 55 had been removed.

The dispensing means of a second form of the invention as illustrated in Fig. 6 includes an air inlet tube 61 leading from a motor-pump unit 62 to the upper portion of a first container or bottle 63 for beverage or liquid, a first liquid outlet tube 64 open from the bottom of the first container 63 to the top of a second container 65, and a second liquid outlet tube 67 incorporating a vertical tubular element 66 at one end thereof open to the bottom of the second container 65 and an outlet spout 68 open to position outside of a cabinet such as that shown in the first five figures as cabinet 15 (not shown in Fig. 6). An air relief tube 36 and an air relief valve 39 identical with those shown in the first five figures of the drawings are associated with the air inlet tube 61. Other parts of the device are identical with those shown in connection with the first form of the invention. Operation of the air relief valve 39 and activation of the motor pump unit will cause air pressure to build up in the first container 63 to force liquid through the liquid outlet tube 64 into the second container 65 where pressure will build up to cause liquid to be dispensed through the liquid outlet tube 67. It will be evident that the arrangement as in Fig. 6 could be employed to interconnect all of the containers 23 and thus make it unnecessary to shift a cover cap from one container to another as containers are emptied.

In the third form of the invention as disclosed in Fig. 7, the dispenser is set up to dispense different beverages or liquids from two different containers 70 and 71. A motor air pump unit 72 has two separate and independent air outlet connections, one associated with air inlet tube 73 which opens into the top of the container 70 and one associated with air inlet tube 76 which opens into the top of container 71. A liquid outlet tube 74 includes an outlet spout 75 and is open from the bottom of the container 70 to the outer end of the outlet spout. A liquid outlet tube 77 includes an outlet spout 78 and is open from the bottom of the container 71 to the outlet of the outlet spout 78. Air relief tubes each denoted 36 and air relief valves each denoted 39 are associated with air inlet tubes 73 and 76 in exactly the same manner as is indicated in connection with the first form of the invention.

When it is desired that a beverage or other liquid be dispensed from the container 70, the motor air pump unit 72 is activated and the air relief valve 39 associated with the air inlet tube 73 is depressed to block the corresponding air relief tube and to permit the build up of air pressure inside of the top of the container 70. Liquid will be dispensed in the same manner as was described in the first form of the invention. Inasmuch as the air relief valve 39 associated with the air inlet tube 76 does not block the corresponding air relief tube, no pressure can build up in the air inlet tube 76, and consequently no liquid will be dispensed from the outlet spout 78.

When it is desired that liquid be dispensed from the container 71, the air relief tube 36 associated with the air inlet tube 76 will be blocked by the air relief valve 39, and the motor air pump unit 72 will again be activated.

Should it be desirable to dispense liquid from both containers at once, the motor pump unit will be activated and both of the air relief valves will be depressed to block both of the air relief tubes.

In the fourth form of the invention as illustrated in Figs. 8 through 11, an air inlet tube 81 extends from a motor air pump unit 82 to a top portion of a container 83 through a side wall 84 of a cabinet such as the cabinet 15 of the first form of the invention. A liquid outlet tube 85 extends from a position adjacent the bottom of container 83, through a side wall 86 of said cabinet and terminates in an outlet spout 87.

A switch assembly 88 is mounted on the side wall 86 of the cabinet to have a pivotally mounted switch control arm 89 in vertical alinement below outlet spout 87. A yoke 90 integral with and constituting a lower portion of this switch control arm 89 is situated in position to be contacted by a receptacle when that receptacle is in position to intercept liquid being dispensed through the outlet spout 87. Deflection of the yoke 90 by the receptacle will cause the switch control arm 89 to pivot to cause a switch control arm 91 to depress switch button control lever 92, which will cause switch button 93 to close the switch 94. This provides an electrical connection between an incoming power line 95 and a line 96.

An air relief tube 97 is open to the air inlet tube 81 between the motor pump unit 82 and the container 83. An outer end portion of the air relief tube 97 is permanently affixed in telescoping sealing relationship to a valve seat providing tube 98; and this tube 98 is permanently affixed in sealing relationship to air relief valve slide tube 99. A plurality of air relief openings 100 are provided in tube 99 in position adjacent the tube 98. An air relief valve 101 is illustrated as being constituted of non-magnetic material and is designed to fit in air tight relationship to an outer end of air relief valve seat tube 98 when in closed position. This valve is fixedly mounted on a core 102 of magnetic material slidably mounted in the slide tube 99. A solenoid coil 103 is fixedly mounted to the side wall 84 of the cabinet. This solenoid coil 103 and the magnetic coil 102 together constitute a solenoid 104. The electrical line 96 connects to one side of the solenoid coil while the other side thereof is connected to an incoming power line 105.

Lines 105 and 96 are also connected to the motor of the motor pump unit 82 as is seen in Fig. 11.

When it is desired that liquid be dispensed from the container 83, a receptacle 106 for the liquid is positioned underneath the outlet spout 87, and the receptacle is brought in contact with the yoke 90 to cause an electrical connection to be made between the line 96 and the line 95. This is shown in detail in Fig. 8 and is shown schematically in Fig. 11. The electrical connection between lines 95 and 96 causes the solenoid 104 to be activated and the motor pump unit 82 to begin supplying air to the air inlet tube 81. Activation of the solenoid 104 causes the core 102 thereof to move into symmetrical relationship with respect to the coil 103, and this causes the air relief valve 101 to be brought into sealing relationship to the tube 98.

Air under increasing pressure will then be introduced into the top of the container 83, and this pressure will force liquid from the container out through the liquid outlet tube 85 to be discharged through the outlet spout 87 into the receptacle 106.

When sufficient liquid has been dispensed, the receptacle will be moved in direction away from the switch control arm 89 sufficiently to allow the switch 94 to open. This will cause relaxation of the solenoid 104, and will permit the air under pressure in the air inlet tube 81 to discharge through the air relief tube 97 and the air relief holes 100. The motor pump unit is disabled at the same time, so that no more air is supplied to the air inlet tube 81.

As stated in connection with the first form of the invention, this release of pressure in the air inlet tube will cause a back flow of the liquid in the liquid outlet tube so that there will be an almost immediate cut off of liquid leaving the outlet spout 87.

In the fifth form of the invention as illustrated in Figs. 12 and 13, means is provided whereby liquid can be dispensed automatically from either of a plurality of independent and separate containers. For example, a fruit juice could be dispensed from one container while milk would be available to be dispensed from another container.

In this form of the invention, an air pump delivery pipe 111 of a motor air pump unit 112 opens into a first air delivery tube 113 which in turn is open to the top of a first container 114. This delivery pipe 111 is also open to a second air delivery tube 115 which is open to the top of a second container 116. An air relief tube 117 opens off of the air pump delivery pipe 111, and an air relief valve solenoid assembly 118 is associated in position to be capable of sealing off this air relief tube.

A normally closed solenoid operated air valve 119 is located in the first air delivery tube 113 and a normally closed solenoid operated air valve 120 is located in the second air delivery tube 115.

A first liquid outlet tube 121 is open from the bottom of the first container 114 to the outer end of an integral first outlet spout 122; and a second liquid outlet tube 123 is open from the bottom of the second container 116 to the outlet of integral second outlet spout 124. A first switch assembly 125 is located to have a yoke 126 of a switch control arm 127 located in position to be contacted by a receptacle for dispensed liquid (not shown). Similarly, a second switch assembly 128 is located to have a yoke 129 of a switch control arm 130 situated to be in contacting relationship to a receptacle (not shown) for liquid to be dispensed from container 116.

Deflection of the yoke 126 causes an electrical connection to be instituted between a power input line 131 and a solenoid and motor pump unit power line 132. The power input line 131 is also simultaneously connected to a line 133 which leads to one side of the solenoid of the normally closed air valve 119. The other side of the solenoid of the air valve 119 is connected to a second power input line 134 and the motor pump unit is connected between lines 132 and 134, as is the air relief valve solenoid 118. Deflection of the yoke 129 of the second switch assembly 128 causes an electrical contact to be established between said line 131 and said line 132; and between line 131 and a line 135 which leads to one side of the solenoid of the normally closed air valve 120. The other side of this solenoid is connected to the second power input line 134.

When it be desired that liquid is dispensed from container 114, the receptacle for the liquid will be brought into contact with the yoke 126 to cause electrical connection to be established between the first power input line 131 and line 133. This causes the normally closed air valve 119 to open to allow a passageway to exist along first air delivery tube 113 from the air pump delivery pipe 111 to the top of the container 114. The establishment of the electrical connection between lines 131 and 132 simultaneously activates the first air relief valve solenoid assembly to block the end of air relief tube 117. Air under pressure will then be delivered to the top of the container 114 and this will force liquid to be dispensed from the outlet spout 122 in the manner heretofore described. When sufficient liquid has been dispensed, the receptacle will be moved away from yoke 126, and the first air relief valve will be moved into clearing relation with respect to the air relief tube 117 to dissipate the air pressure inside of the air pump delivery pipe 111 and the first air delivery tube 113. The air valve 119 can be provided with a time delay feature, so that when the power to the solenoid along lines 133 and 134 is cut off by operation of the switch assembly 125, the air valve will not close until sufficient time has elapsed to allow the air pressure in the top of the first container 114 to be dissipated and to allow the liquid in first liquid outlet tube 121 to return to the container 114.

When it is desired that liquid be dispensed from the second container 116, the receptacle for that liquid can be brought in contact with the yoke 129 and the action of the second switch assembly and the normally closed air valve, the air relief valve solenoid assembly 118 and the motor pump unit will be entirely similar to that explained in connection with the disposing of liquid from container 114.

What is claimed is:

1. In a dispenser, an air tight container for liquid to be dispensed, a pump for providing air under pressure, an electric motor for operating said pump, a circuit for said electric motor, an air inlet tube affording communication between said pump and an upper portion of the interior of said container, a dispensing spout, a liquid outlet tube affording communication between a lower portion of the interior of the container and said dispensing spout, a valve operable selectively to afford and shut off communication between said air inlet tube and atmosphere, and means to be actuable while said circuit is closed and the pump is operable to force air under pressure into said container to cause said valve to be situated to shut off communication between the air inlet tube and atmosphere and to be actuated to cause the valve to be situated to afford communication between said air inlet tube and atmosphere immediately upon cessation of operation of said pump.

2. In a dispenser, an air tight container for liquid to be dispensed, a pump for providing air under pressure, an electric motor for operating said pump, a circuit for said electric motor, an air inlet tube affording communication between said pump and an upper portion of the interior of said container, a dispensing spout, a liquid outlet tube affording communication between a lower portion of the interior of the container and said dispensing spout, a valve operable selectively to afford the shut off communication between said air inlet tube and atmosphere, and means actuable in response to closing of said circuit, thus to render said pump operable to force air under pressure into said container, to cause said valve to be situated to shut off communication between the air inlet tube and atmosphere, said means being actuable in response to opening of the circuit, thus to render the pump incapable of forcing air under pressure into the container, to cause the valve to be situated to afford communication between said air inlet tube and atmosphere.

3. In a dispenser, a plurality of air tight containers for liquid to be dispensed, a pump for providing air under pressure, an electric motor for operating said pump, a circuit for said electric motor, an air inlet tube affording communication between said pump and an upper portion of the interior of a first of said containers, a first liquid outlet tube affording communication between a lower portion of the interior of said first container and an upper portion of the interior of a second of said containers, a dispensing spout, a second liquid outlet tube affording communication between a lower portion of the interior of said second container and said dispensing spout, a valve operable selectively to afford and shut off communication between said air inlet tube and atmosphere, and means to be actuable while said circuit is closed and the pump is operable to force air under pressure into said first container to cause said valve to be situated to shut off communication between the air inlet tube and atmosphere and to be actuated to cause the valve to be situated to afford communication between said air inlet tube and atmosphere immediately upon cessation of operation of said pump.

4. In a dispenser, first and second air tight containers for liquid to be dispensed, a pump for providing air under pressure, an electric motor for operating said pump, a circuit for said electric motor, first and second air inlet tubes each affording communication between said pump and an upper portion of the interior of a different one of said first and second containers, first and second dispensing spouts, first and second liquid outlet tubes affording communication between a lower portion of the interior of one of said first and second containers and a different one of said discharge spouts, valves operable selectively to afford and shut off communication between said first and second air inlet tubes, respectively, and atmosphere, and means to be actuable while said circuit is closed and the pump is operable to force air under pressure into either of said first and second containers to cause the corresponding valve to be situated to shut off communication between the corresponding air inlet tube and atmosphere and to be actuated to cause said corresponding valve to be situated to afford communication between said corresponding air inlet tube and atmosphere immediately upon cessation of operation of said pump.

5. In a dispenser, first and second air tight containers for liquid to be dispensed, a pump for providing air under pressure, an electric motor for operating said pump, a circuit for said electric motor, first and second air inlet tubes opening to an upper portion of the interior of a different one of said first and second containers, an air delivery pipe affording communication between said pump and both of said first and second air inlet tubes, first and second normally closed cut off valves for controlling flow of air through the first and second air inlet tubes, respectively, first and second circuits for said first and second cut off valves, first and second dispensing spouts, first and second liquid outlet tubes affording communication between a lower portion of the interior of said first and second containers and said first and second discharge spouts, respectively, a relief valve operable selectively to afford and shut off communication between said air delivery pipe and atmosphere, and means actuable in response to closing of said electric motor circuit and either of said first and second circuits for said cut off valves, thus to render said pump operable to force air under pressure into said air delivery pipe and actuate the corresponding cut off valve to open position, to cause said relief valve to be situated to shut off communication between the air delivery pipe and atmosphere, said means being actuable in response to opening of the electric motor circuit, thus to render the pump incapable of forcing air under pressure into the air delivery pipe, to cause the relief valve to be situated to afford communication between said air delivery pipe and atmosphere.

References Cited in the file of this patent

UNITED STATES PATENTS

| | | |
|---|---|---|
| 1,049,301 | Heyman | Dec. 31, 1912 |
| 1,078,028 | Zeamans | Nov. 11, 1913 |
| 1,586,745 | Hulse | June 1, 1926 |
| 2,081,159 | Tamminga et al. | May 25, 1937 |
| 2,272,443 | Tamminga | Feb. 10, 1942 |